(12) United States Patent
Tan et al.

(10) Patent No.: US 9,753,331 B2
(45) Date of Patent: Sep. 5, 2017

(54) ALIGNMENT FILM AND FABRICATION METHOD THEREOF, LIQUID CRYSTAL PANEL AND DISPLAY DEVICE

(71) Applicant: BOE TECHNOLOGY GROUP CO., LTD., Beijing (CN)

(72) Inventors: Jifeng Tan, Beijing (CN); Xinxing Wang, Beijing (CN); Jikai Yao, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/428,491

(22) PCT Filed: Jun. 30, 2014

(86) PCT No.: PCT/CN2014/081134
§ 371 (c)(1),
(2) Date: Mar. 16, 2015

(87) PCT Pub. No.: WO2015/109755
PCT Pub. Date: Jul. 30, 2015

(65) Prior Publication Data
US 2016/0011462 A1    Jan. 14, 2016

(30) Foreign Application Priority Data

Jan. 26, 2014    (CN) .......................... 2014 1 0038923

(51) Int. Cl.
*C09K 19/00* (2006.01)
*G02F 1/1337* (2006.01)
*C09K 19/34* (2006.01)
*C09K 19/32* (2006.01)

(52) U.S. Cl.
CPC ........ *G02F 1/133711* (2013.01); *C09K 19/32* (2013.01); *C09K 19/3475* (2013.01); *G02F 2001/133726* (2013.01); *G02F 2001/133738* (2013.01); *G02F 2001/133742* (2013.01); *Y10T 428/10* (2015.01); *Y10T 428/1005* (2015.01)

(58) Field of Classification Search
CPC .... C09K 19/54; C09K 19/56; C09K 19/3475; C09K 19/32; C09K 2019/328;
(Continued)

(56) References Cited

U.S. PATENT DOCUMENTS 6,875,483 B2    4/2005   Ichihashi et al.
2002/0039627 A1*   4/2002   Ichihashi ............... C09K 19/56
                                                             428/1.1
(Continued)

FOREIGN PATENT DOCUMENTS

CN          1625715 A      6/2005
CN        101261328 A      9/2008
(Continued)

OTHER PUBLICATIONS

International Search Report with Notice of Transmittal of the International Search Report of PCT/CN2014/081134 in Chinese, mailed Nov. 19, 2014.
(Continued)

*Primary Examiner* — Ruiyun Zhang
(74) *Attorney, Agent, or Firm* — Collard & Roe, P.C.

(57) ABSTRACT

An alignment film and a fabrication method thereof, a liquid crystal panel and a display device, relate to a field of liquid crystal display technology, which can avoid causing static electricity and generating dust during a rubbing process, as well as unevenness of alignment. The method comprises: dispersing discotic liquid crystal molecules containing hydrophobic branched chains in a solvent, to prepare a discotic liquid crystal molecule solution (101); and applying the discotic liquid crystal molecule solution on a substrate, and obtaining the alignment film after removing the solvent (102).

11 Claims, 2 Drawing Sheets

(58) Field of Classification Search
CPC ......... C09K 2019/458; G02F 1/133711; G02F 2001/133742; G02F 2001/133738; G02F 2001/133726; G02B 5/305; G02B 5/3016; Y10T 428/10; Y10T 428/1005
USPC .......... 428/1.1, 1.2; 349/123–125, 127, 130, 349/132; 427/162; 524/179
See application file for complete search history.

(56) References Cited

U.S. PATENT DOCUMENTS

| | | | |
|---|---|---|---|
| 2004/0234706 A1* | 11/2004 | Uehira | ............... C09K 19/3475 428/1.3 |
| 2005/0003110 A1 | 1/2005 | Tanaka et al. | |
| 2008/0218671 A1 | 9/2008 | Nakamura | |

FOREIGN PATENT DOCUMENTS

| | | |
|---|---|---|
| CN | 103424934 A | 12/2013 |
| CN | 103809330 A | 5/2014 |
| EP | 1 170 353 A2 | 1/2002 |
| JP | 4309022 B2 | 8/2009 |

OTHER PUBLICATIONS

Written Opinion of the International Searching Authority of PCT/CN2014/081134 in Chinese with English translation mailed Nov. 19, 2014.

* cited by examiner

ALIGNMENT FILM AND FABRICATION METHOD THEREOF, LIQUID CRYSTAL PANEL AND DISPLAY DEVICE

CROSS REFERENCE TO RELATED APPLICATIONS

This application is the National Stage of PCT/CN2014/081134 filed on Jun. 30, 2014, which claims priority under 35 U.S.C. §119 of Chinese Application No. 201410038923.6 filed on Jan. 26, 2014, the disclosure of which is incorporated by reference.

TECHNICAL FIELD

Embodiments of the invention relate to an alignment film and a fabrication method thereof, a liquid crystal panel and a display device.

BACKGROUND

A liquid crystal panel in a liquid crystal display (LCD) is constituted by two substrates and a liquid crystal layer therebetween, and an electrical signal may be applied to the liquid crystal panel to control liquid crystal in the liquid crystal layer to rotate, so as to implement image display. In order to obtain a uniform brightness and a high contrast, liquid crystal molecules within the liquid crystal panel must be arranged in a certain direction. Thus, prior to formation of the liquid crystal layer, it is necessary to firstly form alignment films on the two substrates respectively, so that the liquid crystal molecules are arranged in a certain direction according to the alignment films, The alignment film in the prior art is usually fabricated by a rubbing method, although it is widely used due to a more mature technology, a simple production process and a low cost, yet there are still drawbacks difficult to solve: 1. the rubbing process will cause static electricity and generate dust, and cause certain damage to the substrate; 2. the rubbing method at present only works for a flat surface, but for an irregularly-shaped substrate, the rubbing will cause uneven alignment.

SUMMARY OF THE INVENTION

The embodiments of the invention provide an alignment film and a fabrication method thereof, a liquid crystal panel and a display device, which can avoid causing static electricity and generating dust during the rubbing process, as well as unevenness of alignment.

To achieve the above objective, the embodiments of the invention employ technical solutions as follows:

A fabrication method of a discotic liquid crystal self-assembly alignment film, comprises:

Dispersing discotic liquid crystal molecules containing hydrophobic branched chains in a solvent, to prepare a discotic liquid crystal molecule solution;

Applying the discotic liquid crystal molecule solution on a substrate, to obtain an alignment film after removing the solvent.

Optionally, applying the discotic liquid crystal molecule solution on a substrate, to obtain an alignment film after removing the solvent, includes:

Instilling a layer of the discotic liquid crystal molecule solution onto a hydroxylated substrate, and removing the solvent by evaporation after spin coating, to obtain the alignment film.

Optionally, the discotic liquid crystal molecules include TCnAT.

Optionally, the solvent in the discotic liquid crystal molecule solution includes chloroform, and a concentration of the discotic liquid crystal molecule solution is 0.001 wt %-5 wt %.

Optionally, a fabrication method of the hydroxylated substrate includes:

Performing an ultrasonic treatment with a hydrochloric acid solution on the substrate, after washing the substrate;

Soaking the substrate in concentrated $H_2SO_4$, after the substrate undergoing the ultrasonic treatment is washed with ultrapure water;

Boiling the soaked substrate in the ultrapure water, and then blow-drying the same with high purity nitrogen, to obtain the hydroxylated substrate.

Optionally, n in TCnAT is less than or equal to 6 or is greater than or equal to 12.

Optionally, n in TCnAT is 2, 6 or 12,

An alignment film comprises discotic liquid crystal molecules containing hydrophobic branched chains.

Optionally, the discotic liquid crystal molecules include TCnAT.

A liquid crystal panel comprises two display substrates and liquid crystal between the two display substrates, the above-described alignment film being disposed at an inner side of at least one display substrate.

Optionally, the alignment film disposed at the inner side of the display substrate is a homogeneous alignment film, or a homeotropic alignment film.

Optionally, in the two display substrates, the alignment film at the inner side of one display substrate is the homogeneous alignment film, and the alignment film at the inner side of the other display substrate is the homeotropic alignment film.

Optionally, n of TCnAT in the homogeneous alignment film is 2 or 6, and n of TCnAT in the homeotropic alignment film is 12.

A display device comprises: the above-described liquid crystal panel.

The alignment film and the fabrication method thereof, the liquid crystal panel and the display device provided by the embodiments of the invention, by using a method of taking the discotic liquid crystal molecule self-assembly film as the alignment film, apply the self-assembly properties of discotic liquid crystal molecules in the alignment film, so that a nematic-phase liquid crystal can perform alignment autonomously, which solves the technical problems such as static electricity and dust caused by alignment with mechanical rubbing, and meanwhile, for the substrate with an irregular shape or an uneven surface, the alignment film provided by the embodiments of the invention can also ensure evenness of the alignment.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
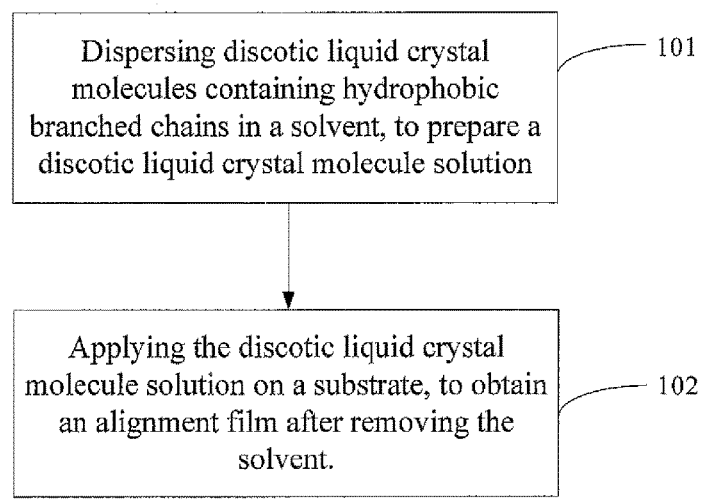
FIG. 1 is a flow schematic diagram of a fabrication method of an alignment film provided by an embodiment of the invention.

An embodiment of the invention provides a fabrication method of a discotic liquid crystal self-assembly alignment film, and as illustrated in FIG. 1, the method comprises:

101: dispersing discotic liquid crystal molecules containing hydrophobic branched chains in a solvent, to prepare a discotic liquid crystal molecule solution.

The discotic liquid crystal (DLC) molecule usually includes two basic components: a core, and flexible aliphatic side chains surrounding the core. Five kinds of molecules illustrated below are just the discotic liquid crystal molecules, with hydrophobic branched chains of R as $C_nH_{2n+1}$.

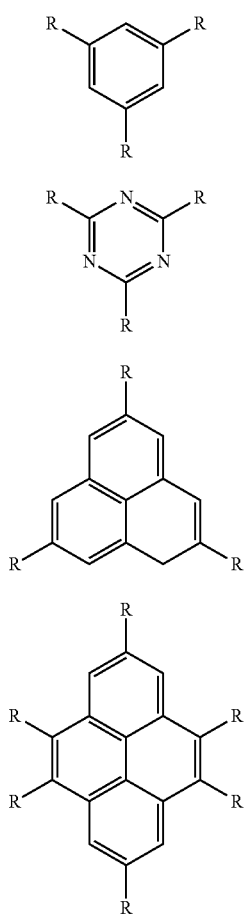

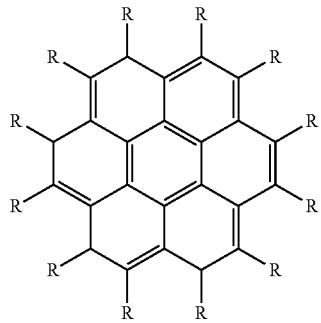

Three kinds of molecules with benzene as the core illustrated below are also the discotic liquid crystal molecules, with hydrophobic branched chains as $C_nH_{2n+1}$.

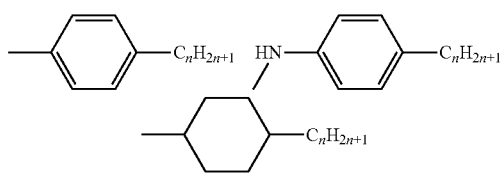

For example, 2,4,6-tris-4-n-alkyl-anilino-1,3,5-triazine (TCnAT) is a type of discotic liquid crystal molecules, with a chemical formula as:

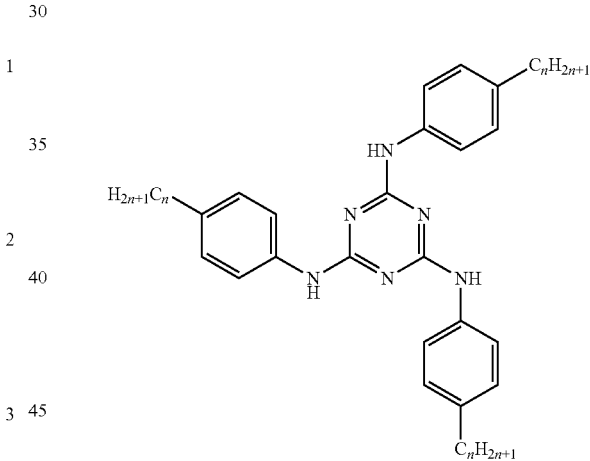

Where n in TCnAT is the number of carbon atoms in the flexible alkyl chain, i.e., "n" in the above-described chemical formula.

TCnAT may be formed by a reaction between cyanuric trichloride and p-alkyl aniline, with a synthetic route illustrated below as that, under an alkaline condition (potassium carbonate), a substitution reaction occurs between chlorine atoms in cyanuric trichloride and an amino group in p-alkyl aniline, to generate the discotic liquid crystal molecules TCnAT.

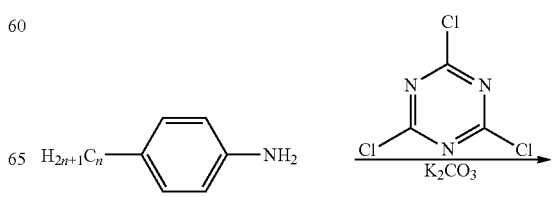

-continued

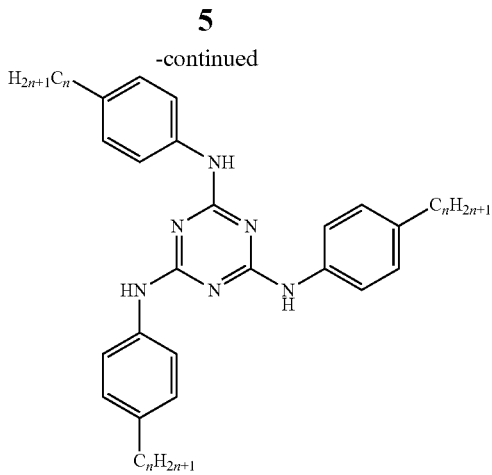

Of course, in the above reaction, the chlorine atoms in cyanuric trichloride may be substituted by other halogen atoms, which does not affect the generation of the discotic liquid crystal molecules TCnAT.

Hereinafter, it will be illustrated with the discotic liquid crystal molecules being TCnAT as an example.

Optionally, when the discotic liquid crystal molecules are TCnAT, the solvent in the discotic liquid crystal molecule solution includes chloroform, and a concentration of the discotic liquid crystal molecule solution is 0.001 wt %-5 wt %.

102: forming the discotic liquid crystal molecule solution on a substrate, to obtain an alignment film after removing the solvent.

Optionally, the discotic liquid crystal molecule solution may be formed on a hydroxylated substrate, and the alignment film is obtained after the solvent is removed. The hydroxylated substrate is more conductive to adsorption of the discotic liquid crystal molecules.

The fabrication of the hydroxylated substrate includes steps of:

Step S1: performing an ultrasonic treatment with a hydrochloric acid solution on the substrate, after washing the substrate.

Step S2: soaking the substrate in concentrated $H_2SO_4$, after the substrate undergoing the ultrasonic treatment is washed with ultrapure water.

Step S3: boiling the soaked substrate in the ultrapure water, and then blow-drying the same with high purity nitrogen, to obtain the hydroxylated substrate.

Exemplarily, the steps of fabricating the hydroxylated substrate are: performing the ultrasonic treatment on the 2.0 cm×2.5 cm substrate with 6M hydrochloric acid solution for 30 min, after the substrate is washed; soaking the substrate in concentrated $H_2SO_4$ for 1h, after it is taken out and washed with the ultrapure water; and then boiling the substrate in the ultrapure water for about 4h, and blow-drying the same with high purity nitrogen, to obtain a rich hydroxylated substrate.

After the hydroxylated substrate is obtained, the discotic liquid crystal molecule solution may be spin coated onto the hydroxylated substrate, to obtain the alignment film after the solvent is removed. Optionally, a layer of the discotic liquid crystal molecule solution may be instilled onto the hydroxylated substrate, spin coated at a certain rotational speed for a preset time, and then the solvent is removed by evaporation for 1-3 hours, to obtain the self-assembly alignment film of the discotic liquid crystal molecules TCnAT with different concentrations in a molecular self-assembly mode. The certain rotational speed is 1,000-3,000 rp/min, and the preset time is 20-50s; preferably, the certain rotational speed is 2,000 rp/min, and the preset time is 30s.

The molecular self-assembly refers to a phenomenon that the molecules are self-aggregated and organized into a regular structure, without intervention of external force from human. Currently, the molecular self-assembly has gradually become a main mode for constructing an organic functional material, and such a process can assemble an ordered anisotropic molecular structure in a macro dimension according to a certain spatial distribution.

Materials contained in the above-described alignment film is the discotic liquid crystal molecules TCnAT, which has an amphiphilic structural feature; and the unique amphiphilic molecular structure of amphiphilic discotic liquid crystal molecules and the molecular self-assembly mode of on a surface of the self-assembly film decided thereby play a key role in the alignment of the nematic-phase liquid crystal. In the process of evaporating the solvent, the amphiphilic molecules of a gas-liquid interface are arranged vertically or horizontally in the air in a stretching manner, so as to obtain a minimum interfacial free energy, and in the meantime allow the self-assembly film to have a relatively strong hydrophobic property.

In the alignment process of the nematic-phase liquid crystal, due to an effect of intermolecular hydrogen bonds, the molecules near the alignment layer draw close to the disc core center of the discotic molecules; due to an effect of the flexible branched chains, the liquid crystal molecules near the alignment layer can be arranged vertically or horizontally; due to an interaction force between molecules, the system is gradually transformed into a homeotropic alignment or a homogeneous alignment; generally, in a case where n in TCnAT is greater than or equal to 12, the branched chains are relatively long, which will induce the nematic-phase liquid crystal to be in the homeotropic alignment; and in a case where n in TCnAT is less than or equal to 6, the branched chains are relatively short, which will induce the nematic-phase liquid crystal to be in the homogeneous alignment.

Figure 2:
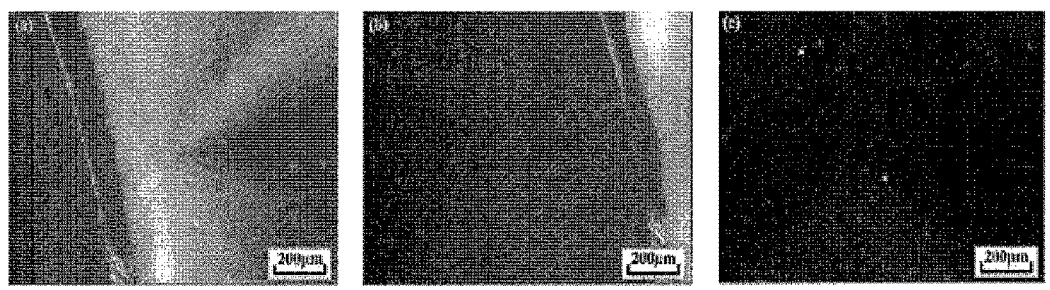
FIG. 2 is a process schematic diagram of infusing liquid crystal into a homeotropic alignment film provided by the embodiment of the invention.

During an experiment, the alignment film is self-assembled by using a 1 wt % TC 12AT solution, and the alignment process of the liquid crystal molecules in a liquid crystal injection process is observed under a polarizing microscope: in the liquid crystal injection process, due to an impact of a liquid crystal flow force, the liquid crystal molecules are arranged in a bending-stretching-deforming quasi-parallel manner along an injection direction; when the liquid crystal fully fills the liquid crystal cell, and the fluid flows no longer, as illustrated in (a) of FIG. 2, the liquid crystal near the alignment layer will be in the homeotropic alignment and dark fields will occur, whereafter the liquid crystal molecules in the cell, due to an acting force of the self-assembly alignment film, is gradually transformed into the homeotropic alignment, and a large number of dark fields occur (as illustrated in (b) of FIG. 2), and a region of the dark fields is gradually nucleated and spreads to the entire region with time (as illustrated in (c) of FIG. 2). From the above-described phenomenon observed, it can be seen that the alignment film fabricated is the homeotropic alignment film.

Figure 3:
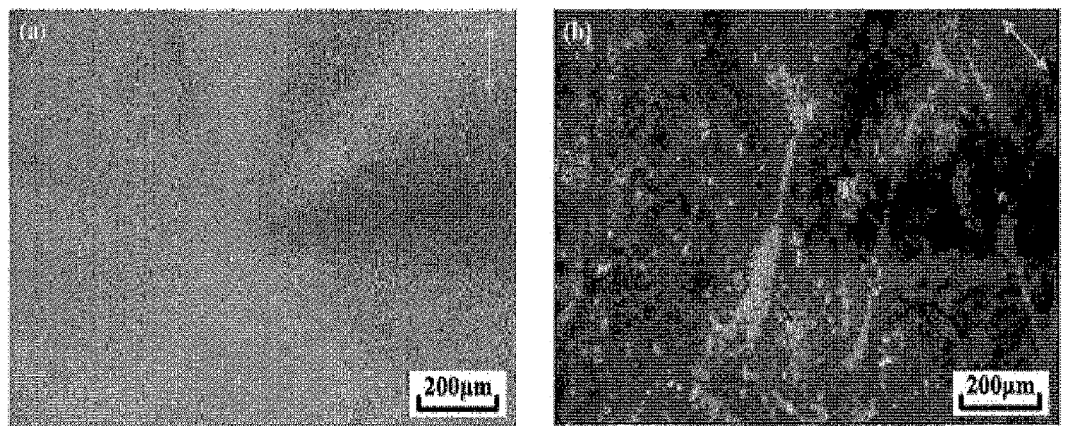
FIG. 3 is a process schematic diagram of infusing liquid crystal into a homogeneous alignment film provided by the embodiment of the invention.

The alignment film is self-assembled by using a 0.5wt % TC2AT solution, and is observed on a stage rotated between crossed polarizers under a polarizing microscope, the liquid crystal cell gradually presents variation between light and dark (as illustrated in (a) and (b) in FIG. 3), which indicates that the liquid crystal molecules are arranged horizontally, i.e., the alignment film fabricated is the homogeneous alignment film.

The fabrication method of the alignment film provided by the embodiment of the invention, by the method for self-assembling the alignment film by using the discotic liquid crystal molecules TCnAT, solves the technical problems such as static electricity and dust caused by alignment with mechanical rubbing, and meanwhile, for the substrate with an irregular shape or an uneven surface, the alignment film provided by the embodiment of the invention can also ensure the evenness of the alignment.

An embodiment of the invention further provides an alignment film, which is fabricated by the method provided by the embodiment of the invention, comprising: discotic liquid crystal molecules containing hydrophobic branched chains. Preferably, the discotic liquid crystal molecules are TCnAT.

Generally, in a case where n in TCnAT is greater than or equal to 12, the branched chains are relatively long, which will induce the nematic-phase liquid crystal to be in a homeotropic alignment; and in a case where n in TCnAT is less than or equal to 6, the branched chains are relatively short, which will induce the nematic-phase liquid crystal to be in a homogeneous alignment. Therefore, a range of n of TCnAT in the alignment film is greater than or equal to 12 or less than or equal to 6.

An embodiment of the invention further provides a liquid crystal panel, which comprises two display substrates and liquid crystal between the two display substrates, wherein, the alignment film provided by the embodiment of the invention is disposed at the inner side of at least one display substrate.

Figure 4:
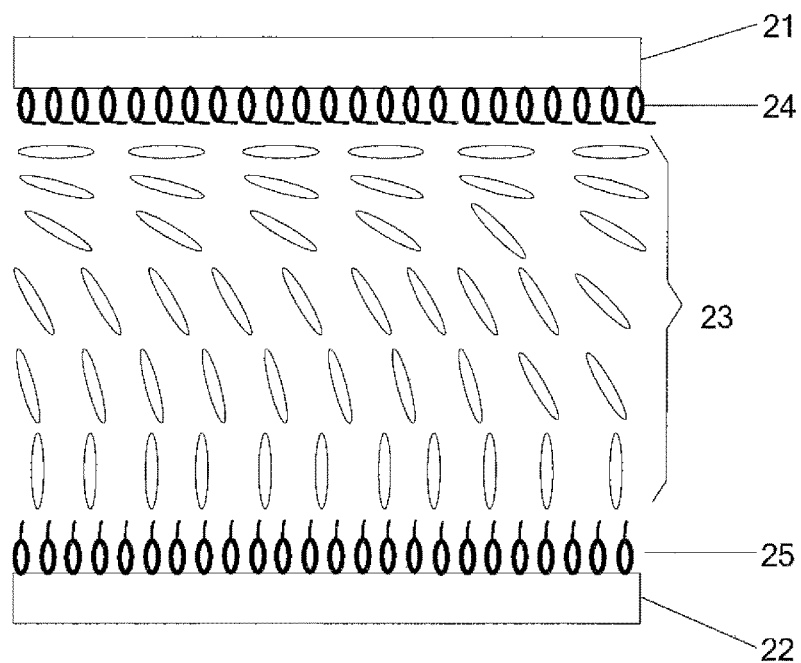
FIG. 4 is a structural schematic diagram of a liquid crystal panel provided by an embodiment of the invention.

In one example, the liquid crystal panel is illustrated in FIG. 4, the two display substrates in the liquid crystal panel include an array substrate 21 and a color filter substrate 22, as well as liquid crystal 23 disposed between the array substrate 21 and the color filter substrate 22. A first alignment film 24 is disposed at an inner side of the array substrate 21, and a second alignment film 25 is disposed at an inner side of the color filter substrate 22.

The first alignment film and the second alignment film are both the alignment films fabricated by using the method provided by the embodiment of the invention.

Optionally, the first alignment film and the second alignment film may both be homogeneous alignment films, or may both be homeotropic alignment films; preferably, one of the first alignment film and the second alignment film is a homogeneous alignment film, and the other is a homeotropic alignment film; optionally, as illustrated in FIG. 4, the first alignment film 24 is the homogeneous alignment film, and the second alignment film 25 is the homeotropic alignment film.

As illustrated in FIG. 4, due to an effect of intermolecular hydrogen bonds, the liquid crystal molecules near the first alignment film 24 draw close to a disc core center of the discotic molecules TCnAT in the first alignment film 24, and since the hydrophobic branched chains are relatively short, the liquid crystal molecules near the first alignment film 24 are arranged horizontally; due to interaction between the liquid crystal molecules, the system is gradually transformed into the homogeneous alignment; due to an effect of intermolecular hydrogen bonds, the liquid crystal molecules near the second alignment film 25 draw close to a disc core center of the discotic molecules TCnAT in the second alignment film 25, and due to an effect of relatively long hydrophobic branched chains, the liquid crystal molecules near the alignment layer are arranged horizontally; due to interaction between the liquid crystal molecules, the system is gradually transformed into the homeotropic alignment.

Thus, as illustrated in FIG. 4, one alignment film in the liquid crystal panel is the homogeneous alignment film, and the other alignment film is the homeotropic alignment film, which implements hybrid alignment of a small-molecule nematic-phase liquid crystal, and can meet an alignment requirement of a high-resolution multi-domain liquid crystal display.

The alignment of the small-molecule nematic-phase liquid crystal in the liquid crystal cell mainly depends on hydrophobicity of the branched chains of the discotic liquid crystal molecules and a length of the branched chains, which has little relationship to the disc cores; generally, the relatively long hydrophobic branched chains will induce the nematic-phase liquid crystal to be in the homeotropic alignment, and the relatively short hydrophobic branched chains will induce the nematic-phase liquid crystal to be in the homogeneous alignment.

Generally, in a case where n in TCnAT is greater than or equal to 12, the branched chains are relatively long, which will induce the nematic-phase liquid crystal to be in a homeotropic alignment; and in a case where n in TCnAT is less than or equal to 6, the branched chains are relatively short, which will induce the nematic-phase liquid crystal to be in a homogeneous alignment.

In one example, n of TCnAT in the homogeneous alignment film is 2 or 6, and n of TCnAT in the homeotropic alignment film is 12.

The liquid crystal panel provided by the embodiment of the invention, by using the method of taking the discotic liquid crystal molecules TCnAT self-assembly film as the alignment film, applies the self-assembly properties of the discotic liquid crystal molecules in the alignment film, so that the nematic-phase liquid crystal can perform alignment autonomously, which solves the technical problems such as static electricity and dust caused by alignment with mechanical rubbing, and meanwhile, for the substrate with an irregular shape or an uneven surface, the alignment film provided by the embodiments of the invention can also ensure the evenness of the alignment.

An embodiment of the invention further provides a display device, which comprises the above-described liquid crystal panel; and the display device may be an e-paper, a mobile phone, a tablet personal computer, a television, a monitor, a laptop, a digital photo frame, a navigator, and any other product or component having a display function.

The foregoing embodiments merely are exemplary embodiments of the invention, and not intended to define the scope of the invention, and the scope of the invention is determined by the appended claims.

The present application claims priority of Chinese Patent Application No. 201410038923.6 filed on Jan. 26, 2014, the disclosure of which is incorporated herein by reference in its entirety as part of the present application.

What is claimed is:

1. A method for fabricating an alignment film directly on a surface of a substrate, comprising:
dispersing discotic liquid crystal molecules containing hydrophobic branched chains in a solvent, to prepare a discotic liquid crystal molecule solution; and
applying the discotic liquid crystal molecule solution on the surface of the substrate, and removing the solvent to form the alignment film directly on a surface of a substrate by the discotic liquid crystal molecules, wherein, the discotic liquid crystal molecules include TCnAT with a chemical formula as:

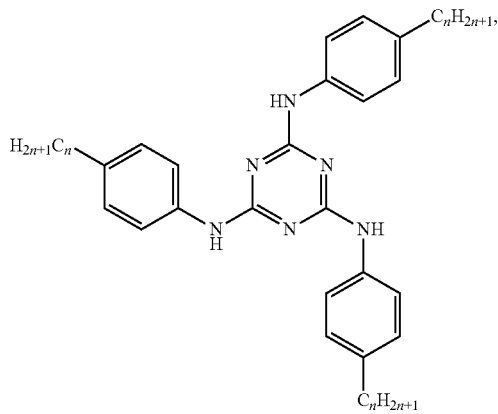

wherein, n in TCnAT is less than or equal to 6 or is equal to 12.

2. The fabrication method according to claim 1, wherein, the solvent in the discotic liquid crystal molecule solution includes chloroform, and a concentration of the discotic liquid crystal molecule solution is 0.001 wt % -5 wt %.

3. The fabrication method according to claim 1, wherein, a fabrication method of the hydroxylated substrate includes:
performing an ultrasonic treatment with a hydrochloric acid solution on the substrate, after washing the substrate;
soaking the substrate in concentrated $H_2SO_4$, after the substrate undergoing the ultrasonic treatment is washed with ultrapure water;
boiling the soaked substrate in the ultrapure water, and then blow-drying the same with high purity nitrogen, to obtain the hydroxylated substrate.

4. The fabrication method according to claim 1, wherein, n in TCnAT is 2.

5. An alignment film directly on a surface of a substrate, comprising discotic liquid crystal molecules containing hydrophobic branched chains,
wherein, the discotic liquid crystal molecules include TCnAT with a chemical formula as:

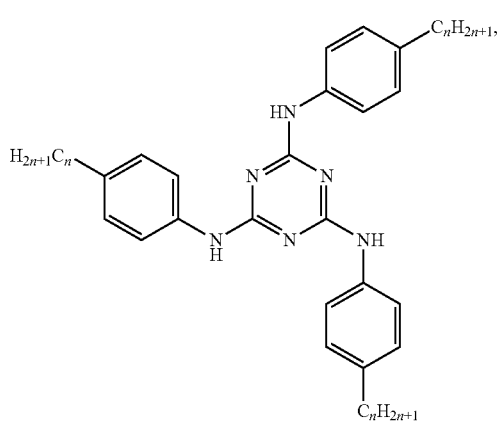

wherein, n in TCnAT is less than or equal to 6 or is equal to 12.

6. The alignment film according to claim 5, wherein, n in TCnAT is 2.

7. A liquid crystal panel, comprising two display substrates and liquid crystal between the two display substrates, wherein,
an alignment film is directly on a surface of a substrate, comprising discotic liquid crystal molecules containing hydrophobic branched chains,
the alignment film is disposed at an inner side of at least one display substrate.

8. The liquid crystal panel according to claim 7, wherein, the alignment film disposed at the inner side of the display substrate is a homogeneous alignment film, or a homeotropic alignment film.

9. The liquid crystal panel according to claim 8, wherein, in the two display substrates, the alignment film at the inner side of one display substrate is the homogeneous alignment film, and the alignment film at the inner side of the other display substrate is the homeotropic alignment film.

10. The liquid crystal panel according to claim 9, wherein: the discotic liquid crystal molecules include TCnAT with a chemical formula as:

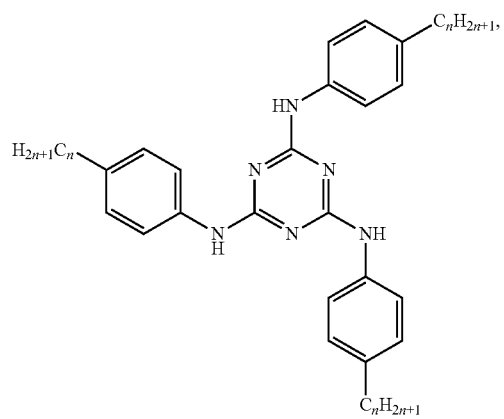

wherein, n is a positive integer, n of TCnAT in the homogeneous alignment film is 2 or 6, and n of TCnAT in the homeotropic alignment film is 12.

11. The fabrication method according to claim 1, wherein, applying the discotic liquid crystal molecule solution on the surface of the substrate, and removing the solvent to form the alignment film directly on a surface of a substrate by the discotic liquid crystal molecules, includes:
instilling a layer of the discotic liquid crystal molecule solution onto a the surface of the substrate which is hydroxylated, and removing the solvent by evaporation after spin coating, to obtain the alignment film.

* * * * *